W. C. BUCKNAM.
GAS CUTTING APPARATUS.
APPLICATION FILED AUG. 23, 1918.

1,318,725.

Patented Oct. 14, 1919.
3 SHEETS—SHEET 1.

INVENTOR
ATTORNEY

UNITED STATES PATENT OFFICE.

WORTHY C. BUCKNAM, OF JERSEY CITY, NEW JERSEY, ASSIGNOR TO DAVIS-BOURNON-VILLE COMPANY, OF NEW YORK, N. Y., A CORPORATION OF NEW YORK.

GAS-CUTTING APPARATUS.

1,318,725.      Specification of Letters Patent.      Patented Oct. 14, 1919.

Application filed August 23, 1918. Serial No. 251,061.

*To all whom it may concern:*

Be it known that I, WORTHY C. BUCKNAM, a citizen of the United States, and a resident of Jersey City, in the county of Hudson and State of New Jersey, have invented a new and useful Gas-Cutting Apparatus, of which the following is a specification.

This invention is an improvement upon and within my prior Patent No. 1,118,183, dated November 24, 1914, covering a portable self-contained and self-propelled apparatus adapted to be set down to travel slowly upon the surface of the work or other base, in order to feed heating and cutting jets at selected uniform speed and distance over the metal, for either straight or circular cutting. The device therein disclosed comprises a small torch-bearing carriage having three or more rolling supports with variable-speed driving means, and a laterally projecting radius-rod and center, whereby the straight-traveling carriage can be caused to describe circles by bringing the center into contact with the work or base and elevating the wheel or wheels at that side. The purpose of the present improvements is to enable the device to cut a substantial range of circles, including those of small diameter, while always supporting the torch outwardly from the carriage, in a position which will not cause injury to the carriage by the heat of the flame, or the molten oxid. In my former patent the torch could be swung from its outboard position to a location between the front wheels, but I now prefer to shift the center inwardly of the front of the carriage for small circles, while leaving the jet-delivering means outside. This may be advantageously accomplished by extending the radius-rod across the front, and by mounting the wheel which is at the side remote from the torch, as well as the center, removably on this rod, so that the center can be placed at various points either outside the wheel or inwardly of its position. In addition, means are provided for displacing the jet-delivering means rectilinearly toward and from its side of the carriage, in order to supplement the range of circles permitted by the movability of the center, and also to enable the apparatus, while traveling straight, to change its line of cut.

In the accompanying drawing illustrating the invention:

Figure 1:
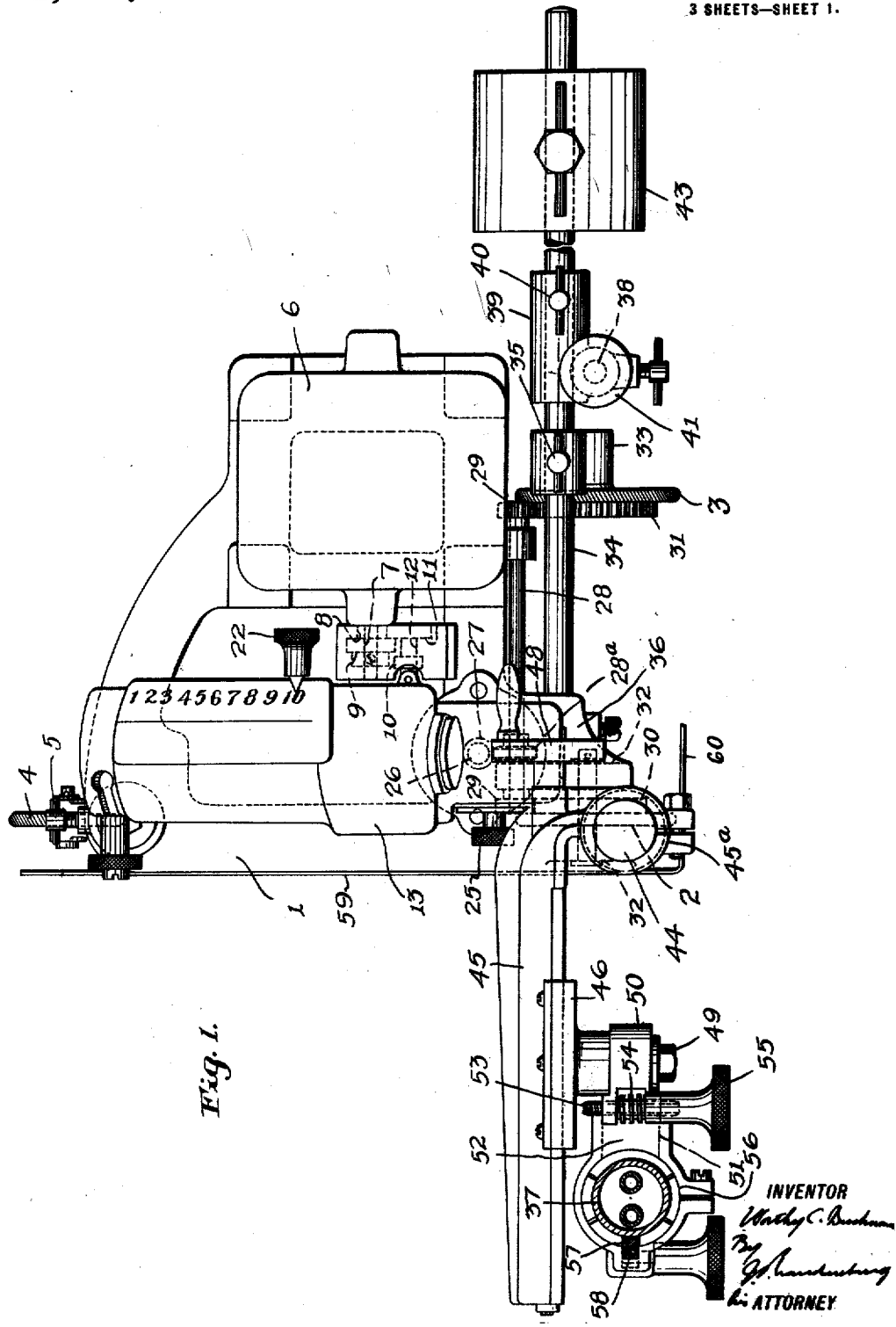
Figure 1 is a plan view, with the torch in horizontal section and an intermediate portion of the radius-rod broken out.
Figure 2:
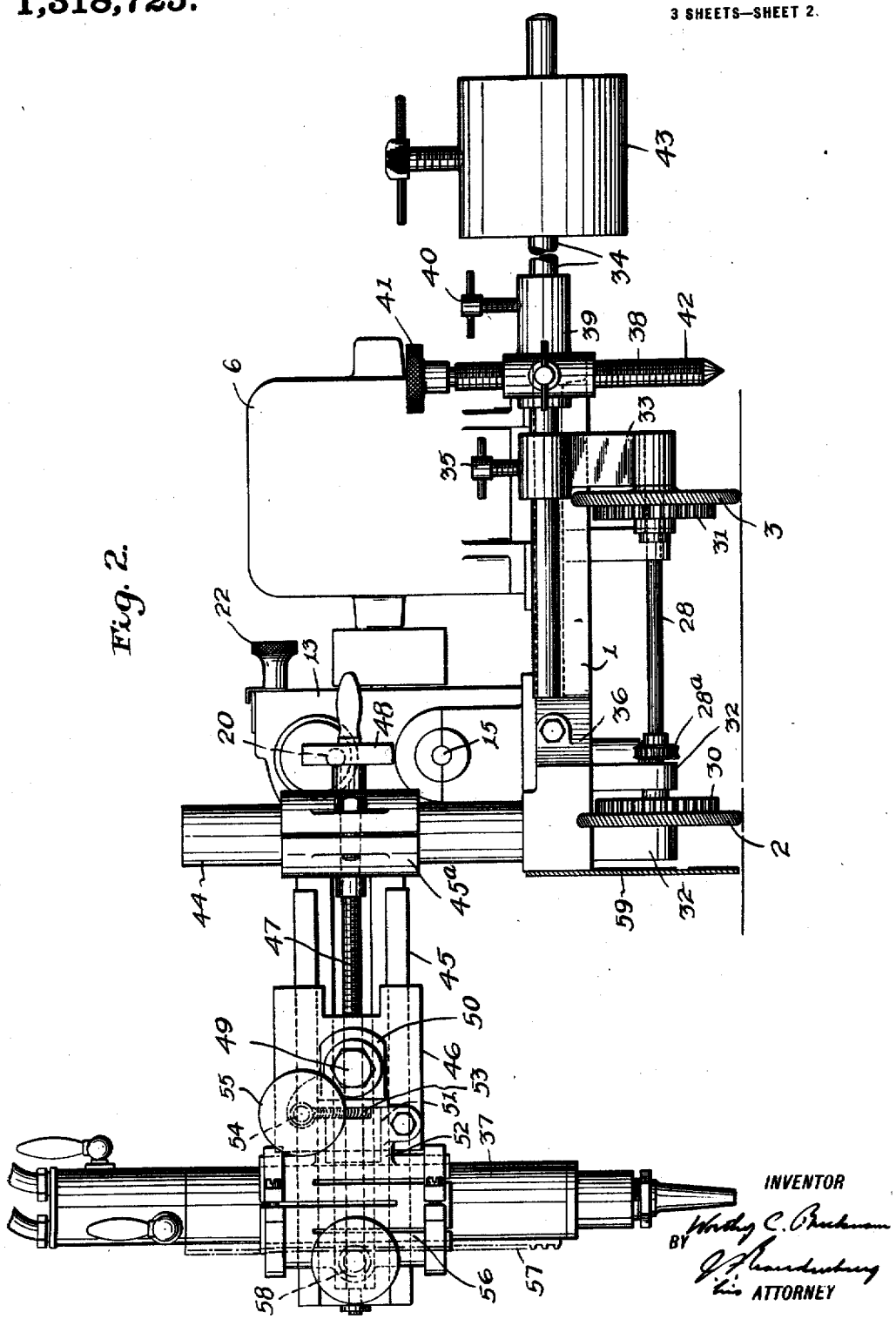
Fig. 2 is a front elevation.
Figure 3:
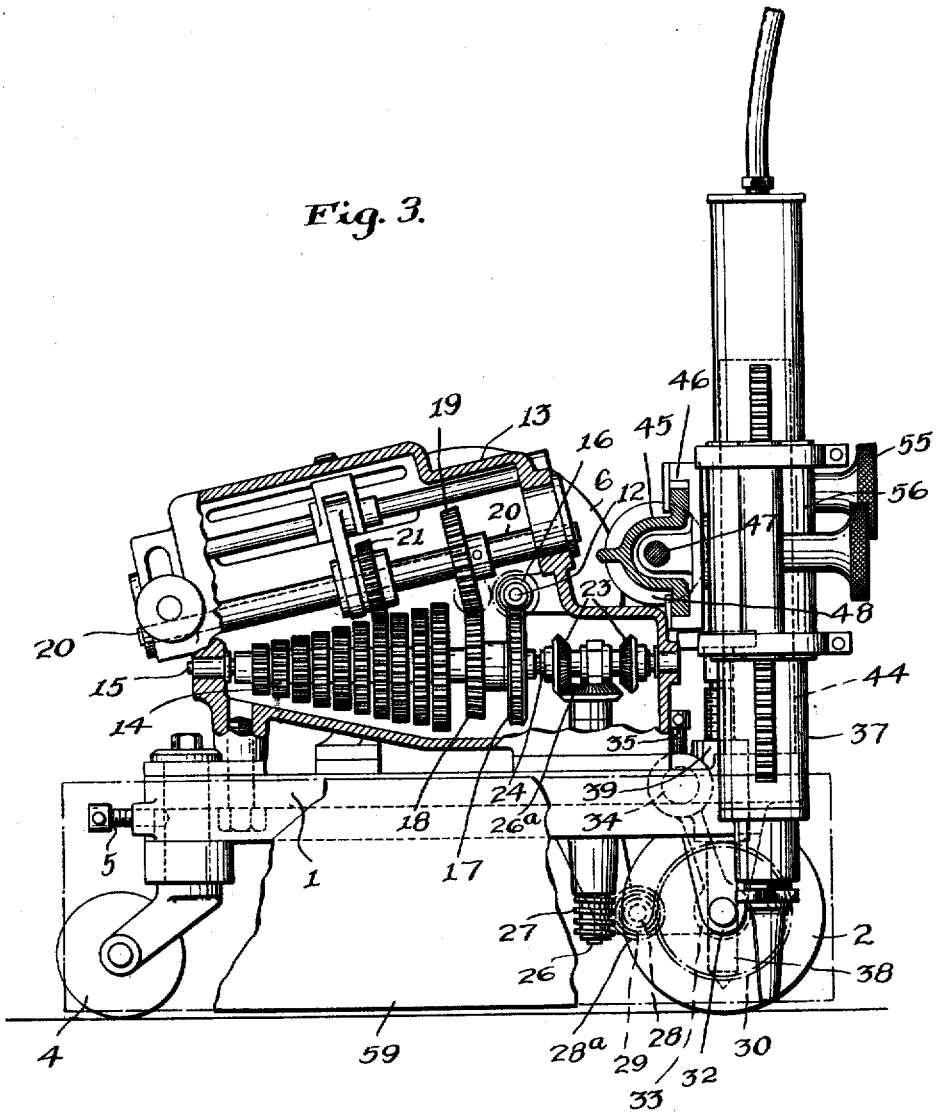
Fig. 3 is a view, partly in side elevation and partly in vertical section, and with the shield partly broken away.

The carriage comprises a platform 1 having three or more vertical wheels, two wheels 2 and 3 in line at one side and a wheel 4 at the other side opposite the forward wheel 2 being sufficient. As in my former patent the rear wheel 3 is a caster wheel, the pintle of which may be fixed or freed at will by turning the hand screw 5. This carriage will travel directly upon the work, or upon a track, or upon any other underlying surface or support.

Means including a motor and a speed reducing gearing are mounted on the carriage for driving it at appropriate uniform speed as the cut progresses. As in the patent aforesaid the nature of the motor may be varied, but I prefer to employ an electric motor 6. This motor is geared to one or more of the rolling supports, preferably to the two front wheels 2 and 3, and means are provided for varying the speed of travel of the carriage, and consequently the rate of advance of the cut, with exactitude. This is important because under any particular set of conditions, that is to say, thickness of metal, nature and size of jets, etc., there is a fairly definite rate at which the jets should be propelled in order to secure the best results, and beyond or below which inferior cutting or entire failure, as well as wastage of gases, will result. In the earlier patent the specific means which I illustrated to vary and hold the speed at any desired value within a substantial range consists of a friction brake which can be adjusted to absorb more or less of the energy of the revolving armature. This is exceedingly simple and sufficiently effective, but I have found that a variable speed gearing, capable of close adjustment, interposed between the motor and the driving wheels, is somewhat more satisfactory, and I have accordingly indicated such a gearing, though I do not, of course, limit myself to either form of instrumentality.

The motor is planted on top of the platform with its armature shaft 7 disposed transversely and provided with a pair of spur gears 8 and 9 of different sizes, which may be set to mesh selectively with a pair of gears 10 and 11 on the portion of a shaft 12 which projects outside a casing 13. The latter contains a cone of gears 14 of closely graduated sizes and substantial number on a shaft 15. The shaft 12 bears a worm 16 inside this casing, meshing with a worm-wheel 17 which is rotatable about the shaft 15 and united with a gear 18, which meshes with a gear 19 on a counter-shaft 20. A gear 21 slidably splined to this shaft and shiftable by a handle 22 may be brought into engagement with any one of the cone of gears 14. Thus a substantial range of speeds, differing slightly one from another, is provided, and further variation may be secured by means of the gears 8, 9, 10, and 11. A pair of bevel gears 23, fixed to a sleeve 24 slidably splined on the shaft 15 and movable by a handle 25, enables the direction of travel to be reversed, by engaging one or other of them with a bevel gear 26ª on a vertical shaft 26, which passes downward through the platform.

On the lower end of the said shaft 26 is a worm 27, which meshes with a worm-wheel 28ª on a transverse counter-shaft 28 beneath the platform. This shaft carries a couple of pinions 29 which mesh with large gears 30, 31 united with the wheels 2 and 4.

The wheel 2 is journaled in fixed bearing lugs 32 projecting downward from the platform, but the wheel 4 is mounted in a bearing bracket 33 which is carried by a transverse radius-rod 34, upon which it is movable and whereon it may be locked at the desired position by a set-screw 35. This radius-rod now projects from a forward corner jut 36 of the platform at the side which is supported by the alined wheels 2 and 3 and beyond which the torch 37 is carried, and from this jut extends across the front of the carriage. At the opposite side of the carriage the rod projects a suitable distance, depending upon the maximum size of circles which it may be desired to cut. The center pin 38 is carried upon the radius-rod in a bracket 39, which may also be moved along the rod and locked by a set-screw 40. The center comprises a vertical rod pointed at the lower end, provided at the top with a knurled head 41 and bearing a screw-thread 42 engaging a corresponding thread in the bracket, so that it may be raised and lowered. When lowered into engagement with the metal to be cut and then screwed farther in the same direction it will raise the wheel 3 clear of the surface, and the caster wheel 4 being freed to swivel, the apparatus is in condition for cutting circles. A weight 43 may be placed on the radius-rod to insure the center holding its position as the carriage travels around it.

The center may be placed farther in or out on the radius rod 34 beyond the wheel 3. For small circles, however, it may be disposed between the position of the wheel 3 and the jet-delivering means. This is easily accomplished by slipping both the wheel and the center off the rod, and then replacing the center as close to the wheel 2 as may be desired.

The torch or blowpipe 37 may be and preferably is a standard oxyacetylene cutting torch. It is supported from a post 44 which rises from the corner portion 36 of the carriage. An arm 45 having a hub 45ª secured to the post, and from which it is preferably offset rearwardly, projects laterally from the carriage for a substantial distance, in the direction opposite to that in which the radius-rod extends. This arm is formed with slideways which are engaged by a slide 46, which may be run in and out on the arm by a screw rod 47 and hand-wheel 48. A clamping pivot screw 49 on the forward side of the slide receives a perforated ear 50, which may be locked in a horizontal or various tilted positions. This ear is part of a member including a swivel journal 51, upon which a swivel sleeve 52 may be turned by means of a worm segment 53 and a worm 54 having a handle 55. The swivel sleeve carries at right angles a torch-holder sleeve 56 in which the torch is slidable up and down, preferably under the control of a rack and pinion 57, 58.

A shield plate 59 is secured to the side of the carriage between the mechanism and the torch, said plate extending downward practically to the base, and preferably having an inward front extension 60.

The operation of the device will be readily understood from the foregoing description and in view of my prior patent. The screw-operated movement of the torch slide 46 on the arm 45 not only affords a wider and more accurate range of adjustment of the radii in circular cutting, but also enables the device when traveling in a straight line to execute a cut with an offset or jog in it, or other somewhat irregular cutting. This is accomplished by simply displacing the torch to one side or other of the former line of cut, by turning the screw 47 at a rate within the judgment of the operator, which will cause the jets to move and cut sidewise. At this time the carriage may be either stationary or in movement.

The movability of the wheel 4 in and out on the radius-rod also has the advantage that it enables the wheel base to be adjusted slightly to the gage of a track base which may be used in straight line cutting.

What I claim as new is:

1. A portable, self-contained, mechanically-driven gas-cutting apparatus for propelling heating and cutting jets in various directions at selected uniform speed and distance over the work, the same comprising a small self-supporting torch-bearing carriage having three or more rolling supports adapted to travel on the surface of the work or other base and variable-speed driving means geared thereto, and a radius-rod with movable center projecting beyond the side of the carriage away from the torch, characterized by the center being positionable either outwardly from said side or between the front wheel positions.

2. A portable, self-contained mechanically-driven gas-cutting apparatus for propelling heating and cutting jets in various directions at selected uniform speed and distance over the work, the same comprising a small self-supporting carriage having three or more rolling supports adapted to travel on the surface of the work or other base and variable-speed driving means geared thereto, jet-delivering means supported at one side of the carriage, and a radius-rod with center projecting beyond the other side thereof, characterized by the radius-rod extending freely across the front of the carriage and having one of the front wheels as well as the center removably mounted thereon so that the center can be placed at various points, either beyond said wheel, or inwardly of its position toward the jet-delivering means.

3. A portable, self-contained, mechanically-driven gas-cutting apparatus for propelling heating and cutting jets in various directions at selected uniform speed and distance over the work, the same comprising a small self-supporting torch-bearing carriage having three or more rolling supports adapted to travel on the surface of the work or other base and variable-speed driving means geared thereto, and a radius-rod with movable center projecting beyond the side of the carriage away from the torch, characterized by means for rectilinearly displacing the torch laterally for offset cutting and to supplement the range of circles afforded by the movability of the center, said means comprising an arm projecting at the side away from the radius-rod, and a slide movable longitudinally of said arm by a screw and wheel and carrying a torch holder.

WORTHY C. BUCKNAM.

Copies of this patent may be obtained for five cents each, by addressing the "Commissioner of Patents, Washington, D. C."